July 11, 1967
M. BROWN
3,330,976
ELECTRO-MECHANICAL DEVICE
Filed April 17, 1964
3 Sheets-Sheet 1
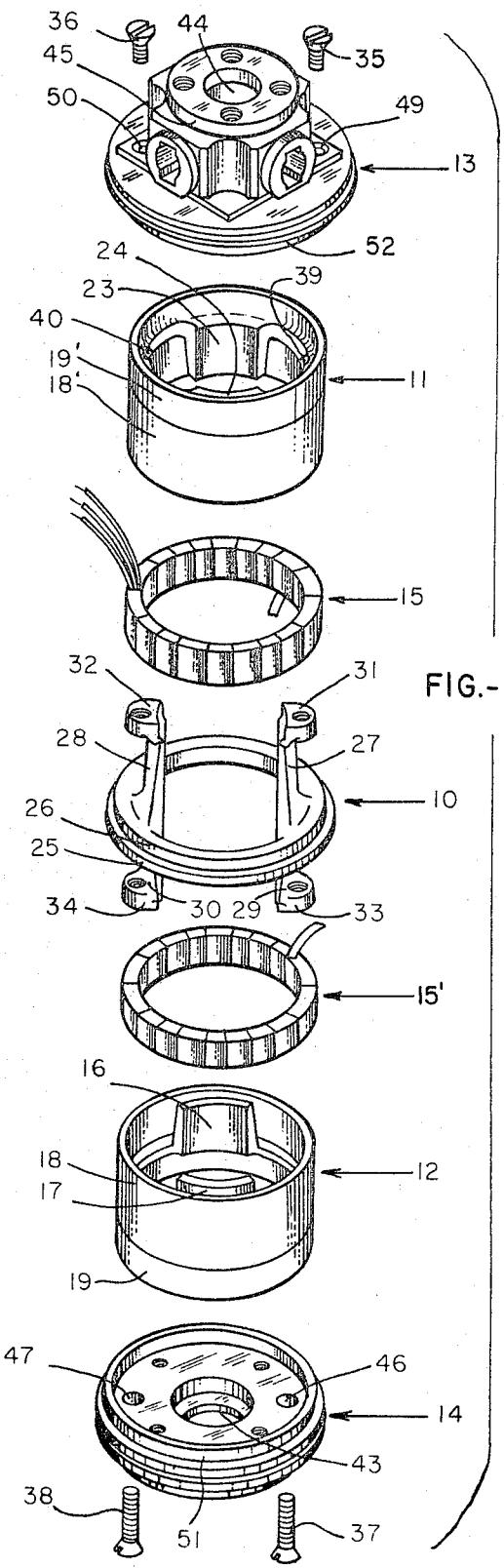
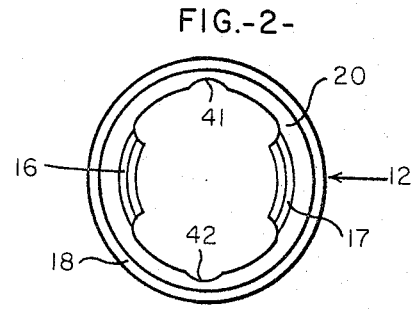
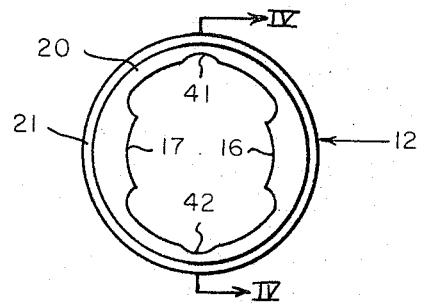
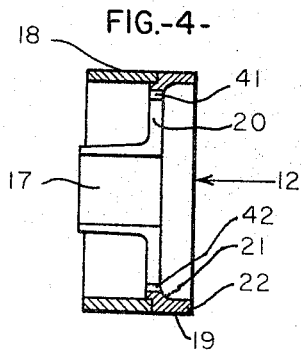
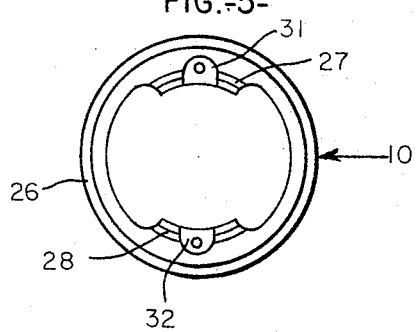
*INVENTOR.*
MARVIN BROWN
BY
*Rudolph J. Jurick*
ATTORNEY

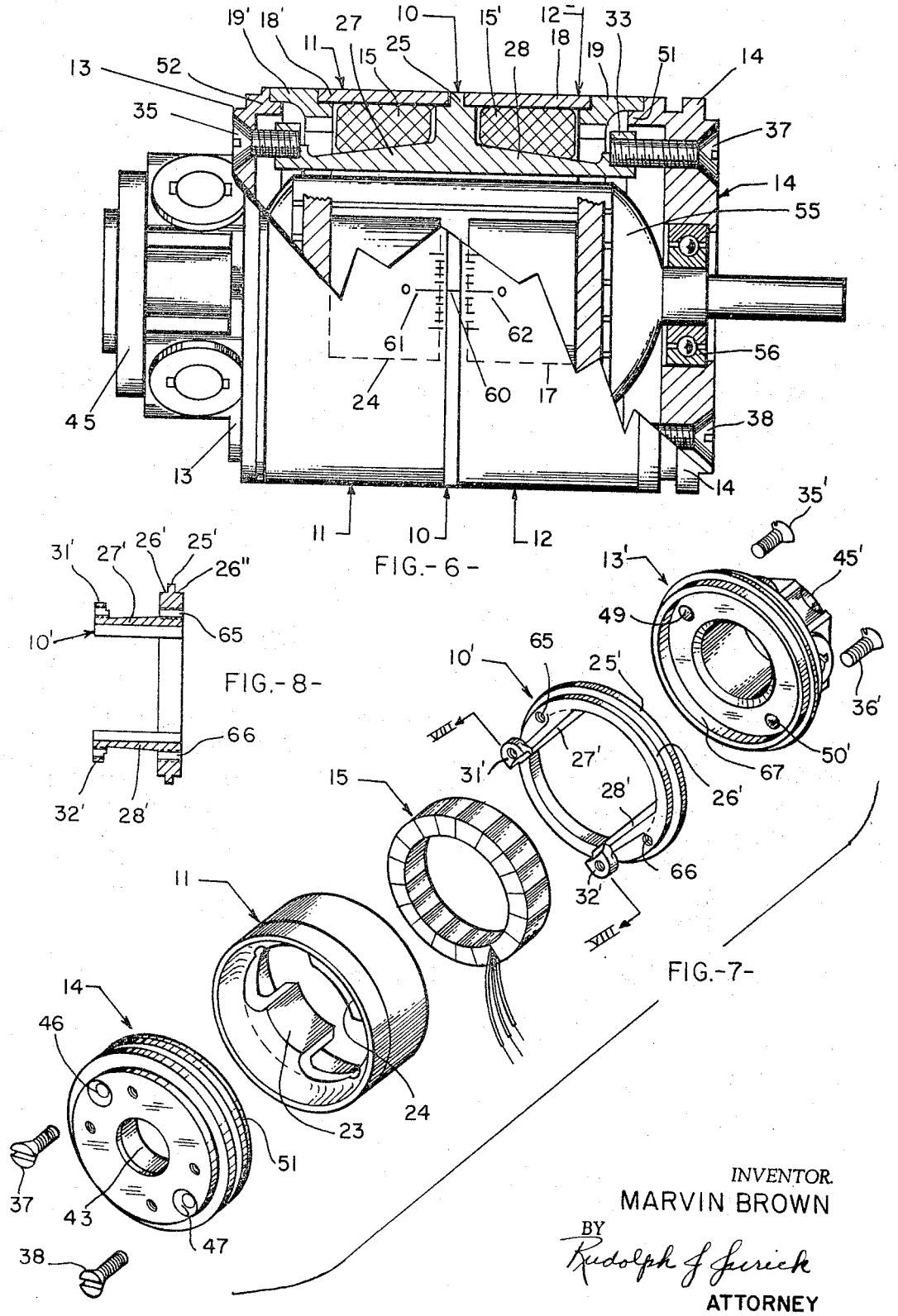

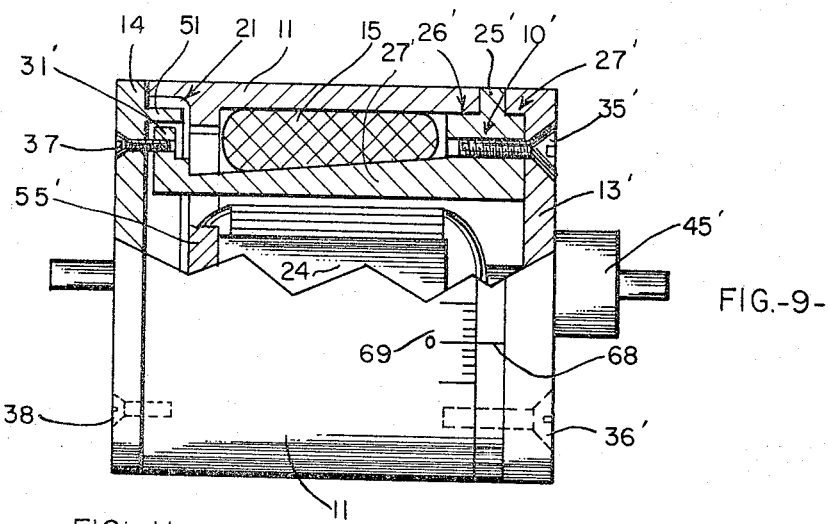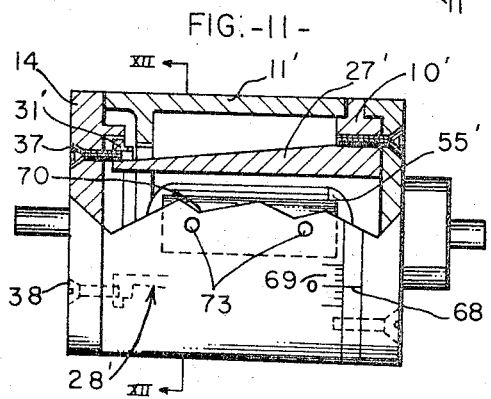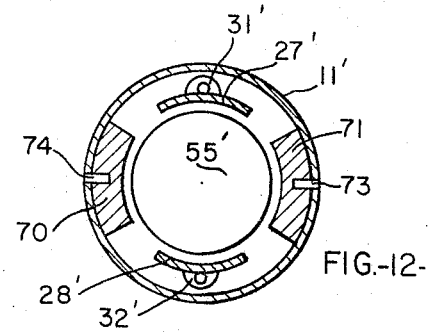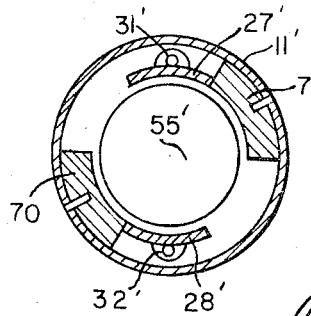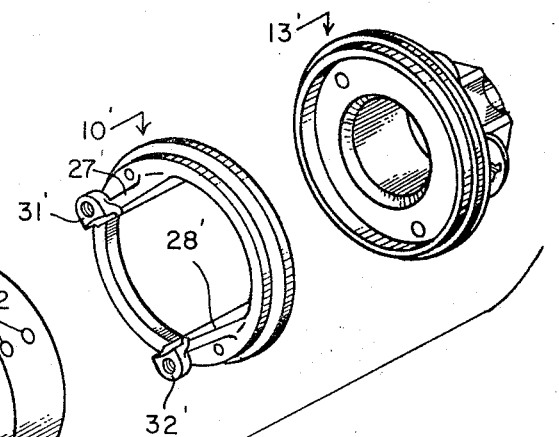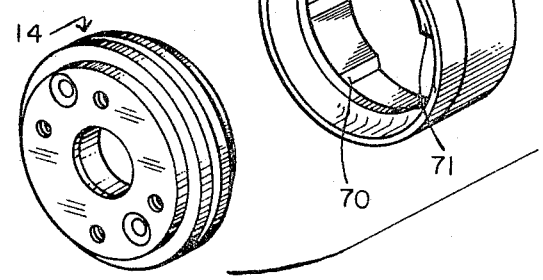

United States Patent Office 3,330,976
Patented July 11, 1967

3,330,976
ELECTRO-MECHANICAL DEVICE
Marvin Brown, 34 Blake Ave.,
Cranford, N.J. 07016
Filed Apr. 17, 1964, Ser. No. 360,493
16 Claims. (Cl. 310—191)

This invention relates to electro-mechanical devices of the class having a magnetic field system and more particularly to the construction of such devices whereby the field system can be modified by changing the spatial relationship of elements forming part of the system.

The invention will be described, hereinbelow, with specific reference to a D.C. motor, although the invention is applicable, broadly, to various electro-mechanical devices involving relatively movable members coupled by a magnetic field. In a more specific sense, the invention is particularly useful in rotary electro-mechanical devices (such as motors and generators) having normally-fixed members for defining the path of the magnetic flux, such as pole pieces. Heretofore, the output energy of such devices has been controlled by increasing or decreasing the electrical energy producing the magnetic field in the first instance as, for example, by varying the voltage applied to a field winding. In a device constructed in accordance with this invention, the pole pieces are spatially adjustable, relative to each other, thereby to modify the form and magnitude of the coupling magnetic field. Such adjustment can be made by the user, in the field, as it does not involve a disassembly of the particular device.

An object of this invention is the provision of an electro-magnetic device constructed and arranged so that normally-fixed members defining a magnetic flux path can be adjusted, relative to each other, without disassembling the device.

An object of this invention is the provision of an electro-mechanical device having a pair of relatively movable members coupled by a magnetic field and wherein the character of the coupling magnetic field can be modified by selectively changing the relative position of members defining the magnetic flux path.

An object of this invention is the provision of an electro-magnetic device having a rotor mounted for rotation in a stator carrying angularly-spaced, adjustable pole pieces.

An object of this invention is the provision of an electro-mechanical device comprising a rotor magnetically coupled to a stator carrying cooperating, spaced pole pieces, the spacing between the pole pieces being adjustable within predetermined limits without disassembling of the device.

An object of this invention is the provision of an electric motor, or the like, wherein the stator is formed of complementary members carrying cooperating sets of pole pieces, and wherein the stator members are adjustable relative to each other thereby to change the spacing between the sets of pole pieces.

These and other objects and advantages will become apparent from the following description when taken with the accompanying drawings showing several embodiments of the invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is an exploded, isometric view showing the components of a stator made in accordance with one embodiment of the invention;

FIGURES 2 and 3 are front and rear elevational views, respectively, of an end stator member;

FIGURE 4 is a vertical, cross-sectional view taken along the line IV—IV of FIGURE 3;

FIGURE 5 is a front, elevational view of the center stator member;

FIGURE 6 is an enlarged, side view of a motor incorporating the components shown in FIGURE 1, with certain parts broken away and other parts shown in cross-section;

FIGURE 7 is an exploded, isometric view showing the components of a stator made in accordance with another embodiment of the invention;

FIGURE 8 is a cross-sectional view of the front stator member and taken along the line VIII—VIII of FIGURE 7;

FIGURE 9 is an enlarged, side view of a motor incorporating the components shown in FIGURE 7;

FIGURE 10 is an exploded view showing the components of a permanent magnet motor made in accordance with this invention;

FIGURE 11 is a side view of the assembled permanent magnet motor, with parts shown in cross-section;

FIGURE 12 is a cross-sectional view taken along the line XII—XII of FIGURE 11; and FIGURE 13 is a similar cross-sectional view but showing a different spatial orientation of the permanent magnets and soft-iron pole pieces.

Reference, now, is made to FIGURE 1, which shows the three components of a stator made in accordance with one embodiment of this invention, namely, the center stator member 10, the right end stator member 11 and the left end stator member 12, the end plates 13 and 14, and the two field coils 15 and 15'. The three stator members 10, 11, 12 are made of a material having a high magnetic permeability, where as the end plates 13 and 14 may be made of aluminum, primarily for weight reduction.

Referring, specifically, to the end stator member 12, such member includes the similar pole pieces 16 and 17, spaced apart 180 mechanical degrees and spaced from the inner wall of the ring portion 18, see also FIGURES 2–4. It may here be pointed out that the stator member 12 is a unitary member, but preferably is an assembly of two pieces to facilitate the manufacture thereof. As best shown in FIGURE 4 (which is a central cross-sectional view taken along the line IV—IV of FIGURE 3), the pole pieces are formed integral with a ring member 19 having an inwardly-directed web 20 joined to the base of the two pole pieces. The wall surface 21, between the web 20 and the cylindrical portion 19, is arcuate, for purposes which will be described hereinbelow. The simple, cylindrical member 18 is welded, or otherwise secured, to the ring member 19 thereby forming the unitary stator member 12. The other end stator member 11, which is identical to the stator member 12, has the pole pieces 23 and 24, see FIGURE 1.

The center stator member 10, is a unitary member comprising the ring portion 25, having an outside diameter equal to that of the end stator members 11 and 12, and reduced-diameter shoulder portions formed on either side thereof, the forward shoulder 26 being visible in FIGURES 1 and 5. Formed integral with the ring member and extending longitudinally therefrom are two sets of spaced pole pieces 27, 28 and 29, 30. These pole pieces have arcuate inner surfaces (polar surfaces) lying on the same diameter as the arcuate polar surfaces of the pole pieces 16, 17 and 23, 24 of the respective end stator members 12 and 11. Each of the pole pieces 27–30, of the center stator member, terminate in upturned ends 31–34 provided with threaded holes for receiving the screws 35–38, which screws serve to secure the parts together in the assembled device, as will be described below.

In assembling together the components shown in FIGURE 1, the field coil 15 is positioned over the pole pieces 27, 28 of the center stator member 10, after which the end stator member 11 is slidably positioned over such field coil, with the end of the stator member 11 abutting the ring portion 25 and supported by the shoulder 26. It will be noted that the inwardly-directed web of the stator member 11 is provided with diametrically-opposed radial notches 39 and 40 for clearing the upturned ends 31 and 32 of the pole pieces 27, 28. The corresponding radial notches in the end stator member 12 are identified by the numerals 41 and 42 in FIGURES 2-4.

The field coil 15' and the end stator member 12 are assembled to the center stator member 10 in a similar manner, after which the armature, not shown, is inserted into the assembly, each end of the armature shaft carrying a ball bearing. One such ball bearing is accommodated by the central hole 43, formed in the end plate 14, when this end plate is placed into abutting relation with the stator member 12. The other ball bearing is accommodated by the central hole 44 provided in the other end plate 13, this end plate including a generally rectangular housing 45 which encloses the commutator and supports the brushes, in the case of a D.C. motor. Each of the end plates 13 and 14 are secured to the center stator member 10 by the associated mounting screws. The screws 37 and 38 pass through the clearance holes 46 and 47 of the end plate 14 and are threaded into the holes provided in the upturned ends 33, 34 of the pole pieces 29 and 30, and the screws 35 and 36 pass through the clearance holes 49 and 50 of the end plate 13 and are threaded into the holes provided in the upturned ends 31, 32 of the pole pieces 27 and 28. The cooperating parts are so formed and dimensioned that the screws firmly secure the three stator members and the two end plates together.

The end plate 14 includes an inwardly-projecting, cylindrical portion 51 which abuts against the arcuate inner wall 21 of the stator member 12, see FIGURE 4. Thus, when the screws 37 and 38 are tightly threaded into the holes provided in the center stator member 10, the frictional force between the end of the cylindrical portion 51 and the arcuate wall 21 of the stator member 12, prevents rotation of this end stator member relative to the center stator member 10. Similarly, the cylindrical portion 52, of the end plate 13, prevents relative turning of the stator members 11 and 10, when the screws 35 and 36 are tightly threaded into the holes provided on the upturned ends 31, 32 of the pole pieces 27 and 28.

When the parts are assembled together in the relative orientations shown in FIGURE 1, the pole pieces 16 and 17, of the end stator member 12, are axially aligned with the similar pole peices 23 and 24, of the end stator member 11, with the pole pieces of the center stator member 10 extending therebetween. In such case, the center lines of the pole pieces of the center stator member 10 are spaced 90 angular degrees from the center lines of the end stator pole pieces, that is, the pole pieces of the end stator members 11 and 12 are spaced 180 electrical degrees from those of the center stator member 10.

With a given magnetic field produced by the field coils 15 and 15', and a given armature, the armature speed of rotation and the output torque of the shaft would have some maximum values. It will now be apparent, however, that by loosening the screws 37 and 38, the end stator member 12 may be rotated by hand, relative to the center stator member 10, thereby changing the angular position of the pole pieces 16 and 17 relative to the pole pieces 29 and 30, of the center stator member, and relative to the pole pieces 23 and 24, of the end stator member 11. Specifically, if the stator member 12 is rotated to its fullest extent clockwise, as viewed in FIGURE 1, the side edges of the pole pieces 16 and 17 would abut the side edges of the pole pieces 29 and 30, respectively. In consequence, the space angle between abutting adjacent sets of pole pieces becomes a minimum value and the magnetic flux coupling the armature becomes a minimum value. In the case of a D.C. motor, the speed of rotation and the output torque are reduced. A still further reduction in speed and torque can be effected by loosening the screws 35 and 36 and rotating the end stator member counterclockwise. In any event, one or both of the outer, end stator members 11 and 12 can be rotated relative to the center stator member 10, to effect a desired reduction in speed and torque, which values will remain constant, thereafter, upon tightening the screws 35-38. This control of the motor output is effected without deliberately changing the electrical energy applied to the field windings, thereby eliminating the need for voltage controllers and/or voltage-dropping electrical networks.

Reference, now, is made to FIGURE 6, which shows a motor incorporating the stator construction shown in FIGURE 1. The upper portions of the end stator members 11 and 12 are broken away to show the armature 55 having a ball bearing 56 force-fitted into the central hole provided in the end plate 14. The other ball bearing is supported by the extension 45 of the opposed end plate 13. The upper portion of the stator assembly is shown in vertical cross-section. As described hereinabove, the end stator member 12 is a unitary member comprising the ring member 19 and the cylindrical member 18. With the screws 37 and 38 fully threaded into the holes provided in the upturned ends of the pole pieces of the center stator member 10, the end stator member 12 is firmly clamped in position between the ring portion 25, of the center stator member, and the cylindrical extension 51 of the end plate 14. Similarly, the end stator member 11 is firmly clamped between the center stator member and the cylindrical extension 52 of the end plate 13. As shown, the field windings 15 and 15' are positioned between the stator members 11 and 12 and the proximate pole pieces of the center stator member 10.

The ring portion 25, of the center stator member 10, may be provided with a fixed reference mark 60 and the rotatable stator members 11 and 12 may be provided with calibrated markings 61 and 62, respectively. An alignment of the zero scale markings, with the fixed reference mark, as shown, indicates that the pole pieces of the end stator members 11 and 12 are axially aligned with each other and spaced equally from the pole pieces of the center stator member. By establishing the characteristics of the particular motor, the markings 61 and 62 can be calibrated so that they may be used as a reference by the user for the purpose of changing the angular position of one or both of the stator members 11 and 12 to provide a desired change in motor speed and torque.

FIGURES 1-6 illustrate a motor having two field structures common to the rotor, that is, there are three stator members, each carrying spaced sets of pole pieces, which members are angularly adjustable relative to each other to effect a modification of the motor speed and torque. Reference now is made to FIGURES 7-9, which show a modified construction wherein the stator comprises two members arranged for relative angular adjustment.

Referring to the exploded view of FIGURE 7, the stator member 11, the field coil 15 and the end plate 14, are identical to the corresponding components shown in FIGURE 1 and, therefore, are identified by the same reference numerals. The stator member 10' is similar to the stator member of FIGURE 1, except that it includes only the two pole pieces 27' and 28' and is provided with threaded holes 65 and 66 for receiving the mounting screws 35' and 36'. As in the FIGURE 1 embodiment, the stator member 10' comprises a flange portion 25', having an outside diameter equal to that of the stator member 11, and reduced-diameter shoulders 26', 26 formed on either side of such ring portion, see particularly FIGURE 8. The end plate 13', carrying the commutator housing 45', is generally similar to the corresponding end plate 13 (FIGURE 1), except that it includes a cylindrical extension 67 designed to encircle the shoulder 26 of the stator member 10'.

In assembling the motor, the end plate 13' is secured to the stator member 10' by means of the mounting screws 35' and 36', whereby these two components constitute a unitary assembly not subject to relative angular displacement. The field coil 15 is then inserted over the pole pieces 27', 28', after which the stator member 11 is slidably positioned over the coil so that the end portion of this stator member encircles the shoulder 26' and abuts against the ring portion 25'. After the armature has been inserted into position, the end plate 14 is secured in place by means of the mounting screws 37, 38, which screws pass through the end plate holes 46, 47 and are threaded into the threaded holes provided in the upturned ends 31', 32' of the pole pieces 27', 28'.

The assembled motor is shown in the enlarged side view, FIGURE 9. As described above, the end plate 13' and the stator member 10' constitute a unitary assembly secured together by the mounting screws 35' and 36'. The mounting screws 37 and 38 secure the other end plate 14 to the stator member 11, it being noted that when the screws are fully threaded into place, the inner surface of the end plate is spaced from the proximate ends of the pole pieces of the stator member 10'. Thus, the cylindrical extension 51, which is integral with the end plate 14, is firmly pressed against the arcuate wall 21 of the stator member 11. Consequently, the stator member 11 is rigidly clamped between the end plate 14 and the stator ring portion 25'. To alter the spatial position of the pole pieces of the two stator members, the screws 37 and 38 are loosened, the stator member 11 is rotated a desired extent, relative to the stator member 10', and the screws again tightened into place. The extent of such relative, angular rotation between the two stator members is indicated by the reference mark 68, carried by the relatively stationary stator member 10', and the graduated markings 69, carried by the adjustable stator member 11, the latter markings being calibrated either in angular degrees or in factors indicative of the speed and/or torque of the armature 55'.

The embodiments of the invention, described to this point, utilize field windings for developing the magnetic flux and soft-iron pole pieces for defining the flux path. A motor, having a permanent magnet field system, will now be described, with specific reference to FIGURES 10–13.

In the exploded view, FIGURE 10, the end plates 13' and 14, and the stator member 10', are identical to the similar parts shown in FIGURE 7. The stator member 11' is also identical to the stator member 11, shown in FIGURE 1, except that, in the present construction, the stator member has secured thereto the permanent magnets 70 and 71, which magnets are of the general size and configuration of the soft-iron pole pieces 23 and 24 (see stator member 11 in FIGURE 7). The stator member 11' (FIGURE 10) is provided with two sets of longitudinally-spaced holes, the forward set of such holes 72 being visible in this particular view. These holes are aligned with bores cast into the permanent magnets, whereby each aligned hole and bore may be filled with solder or a brazing alloy, thereby to secure the magnets to the stator member.

The assembled motor is shown in the side view of FIGURE 11. A comparison of this figure with FIGURE 9 will show that when the zero mark on the scale 69 is aligned with the fixed mark 68, the permanent magnets are equaly spaced from the soft-iron pole pieces of the stator member 10'. This relationship is shown in FIGURE 12, which is a cross-sectional view taken along the lines XII—XII of FIGURE 11. The permanent magnets 70 and 71 are spaced apart 360 electrical degrees, and each magnet is spaced 180 electrical degrees from the soft-iron pole pieces 27', 28'. It may here be pointed out that the plugs, of solder or brazing alloy, which secure the magnets to the stator member 11', are identified by the numerals 73 and 74. Under the condition shown in FIGURE 12, the magnetic flux coupling the rotor 55' is a maximum.

Referring back to FIGURE 11, the space angle between the permanent magnets and the intervening soft-iron pole pieces, can be altered by rotating the stator member 11' upon loosening of the mounting screws 37 and 38. FIGURE 13 illustrates the condition wherein the stator member has been rotated counterclockwise to the fullest extent, that is, to the point where the magnets 71 and 72 engage the soft-iron pole pieces 27' and 28', respectively. Under this condition, the magnetic flux coupling the rotor is a minimum.

From the above description of several embodiments of the invention, it will be apparent that a given magnetic field system can be modified, by the user, by changing the spatial relationship of magnetic material elements which define the path of the magnetic flux. Such modification of the magnetic field (which may be effected quickly and conveniently since it does not require disassembly of the device) alters the form and magnitude of that portion of the field which magnetically couples a fixed member to a movable member. In the case of a rotary electro-mechanical device, the stator consists of two or more members carrying the magnetic pole pieces, which members are arranged for relative rotation about a common axis. It is apparent that any number of uniformly spaced poles may be incorporated in a particular machine, as long as they are spaced 720/P electrical degrees apart, where P represents the total number of poles in the machine.

Having described several specific embodiments of the invention, those skilled in this art will be able to make various changes and modifications without thereby departing from the scope and spirit of the invention as recited in the following claims.

I claim:

1. An electro-mechanical device of the class having a magnetic field system which includes angularly-spaced magnetic material elements defining magnetic poles and a rotatable member mounted for rotation between the poles with a predetermined radial spacing between the rotatable member and the poles, said device being characterized in that the magnetic material elements are mounted for selective angular displacement relative to each other about the axis of the rotatable member without disassembly of the device and without changing the said radial spacing.

2. In an electro-mechanical device of the class comprising a stator magnetically coupled to a rotor, said stator having angularly spaced sets of magnetic material elements defining magnetic poles; the improvement wherein the stator comprises a first member carrying a first set of the magnetic material elements, a second member carrying a second set of the magnetic material elements, means mounting said first and second members for angular adjustment relative to each other about a common axis, and means securing together the said first and second members with the sets of magnetic material elements of said first member spaced a predetermined angular distance from those of the said second member.

3. An electro-mechanical device comprising,
 (a) a stator comprising cylindrical members, each member carrying angularly-spaced pole pieces,
 (b) means mounting the cylindrical members to form the housing for the device with the pole pieces of one member disposed between and angularly spaced from those of the other member,
 (c) means establishing a magnetic field between adjacent pole pieces,
 (d) means securing together the cylindrical members for angular adjustment relative to each other about a common axis, and
 (e) a rotor mounted for rotation relative to all of the pole pieces and magnetically coupled thereto.

4. The invention as recited in claim 3, including end plates abutting the said cylindrical members and closing the ends of the housing, said end plates carrying bearings supporting said rotor.

5. An electro-mechanical device comprising,
   (a) a stator comprising complementary, cylindrical members made of soft-iron, each member carrying angularly spaced magnetic material elements defining magnetic poles,
   (b) clamping means clampingly securing the cylindrical members together to form a cylindrical housing with the magnetic material elements of one cylindrical member interposed between and angularly spaced from those of the other cylindrical member,
   (c) means establishing a magnetic field between adjacently-disposed magnetic material elements, and
   (d) a rotor mounted for rotation within the housing.

6. The invention as recited in claim 5, including end plates abutting the ends of the cylindrical members and carrying bearing means supporting the rotor.

7. The invention as recited in claim 6, including co-operating markings carried by the cylindrical members, which markings are calibrated in terms of the angular spacing between the magnetic material elements carried by one cylindrical member and those carried by the other cylindrical member.

8. The invention as recited in claim 6, wherein one cylindrical member includes a flange portion abutting an end of the other cylindrical member, wherein the magnetic material elements carried by said one cylindrical member are provided with tapped holes, wherein one end plate is secured to the said one cylindrical member and wherein said clamping means comprises the said flange portion and screws which pass through holes formed in the other end plate and are threaded into the said tapped holes.

9. The invention as recited in claim 5, wherein the magnetic material elements carried by one of the cylindrical members are permanent magnets which constitute the said means establishing a magnetic field.

10. A rotary electro-mechanical device comprising,
    (a) a cylindrical stator member carrying spaced, permanent magnets,
    (b) a cooperating stator member having spaced pole pieces positioned between and angularly spaced from the said permanent magnets,
    (c) a first end plate abutting an end of the cylindrical stator member,
    (d) a second end plate abutting the cooperating stator member,
    (e) means securing the second end plate to the co-operating stator member,
    (f) means clampingly securing the said cylindrical stator member between the said cooperating cylindrical member and the said first end plate, and
    (g) a rotor rotatably carried by the said end plates.

11. A rotary electro-mechanical device comprising,
    (a) a center stator member having a cylindrical outer surface and angularly-spaced pole pieces,
    (b) a first cylindrical stator member having angularly-spaced pole pieces and positioned to one side of the center stator member,
    (c) a second cylindrical stator member having a cylindrical portion and angularly-spaced pole pieces and positioned to the other side of the center stator member,
    (d) a first end plate abutting an end of said first stator member,
    (e) a second end plate abutting an end of the second stator member,
    (f) means mounting the three stator members to form a cylindrical housing,
    (g) a field winding disposed within the said cylindrical housing,
    (h) a rotor carried by the said end plates, and
    (i) fastening means clampingly securing the said first and second stator members between the center stator members between the center stator member and the end plates.

12. The invention as recited in claim 11, wherein the said fastening means include screws passing through holes provided in the end plates and threaded into holes formed in the pole pieces of the center stator member.

13. The invention as recited in claim 12, wherein each end plate includes a cylindrical portion extending into the end of the associated stator member when the associated fastening screws are fully threaded into the threaded holes formed in the pole pieces of the center stator member.

14. The invention as recited in claim 11, including co-operating reference markings on the outer surfaces of the three stator members.

15. An electrical motor, or the like, comprising,
    (a) a first central stator member comprising a ring portion having cylindrical shoulders formed on opposed surfaces,
    (b) first and second sets of spaced pole pieces extending from each side of said ring portion, each pole piece having an arcuate polar surface and an offset end, which end has a threaded hole formed therein,
    (c) a second cylindrical stator member having an end positioned over one of the said shoulders, said member having spaced pole pieces extending between the said first set of pole pieces and having corresponding arcuate polar surfaces,
    (d) a third cylindrical stator member having an end positioned over the other of said shoulders, said member having spaced pole pieces extending between the said second set of pole pieces and having corresponding arcuate polar surfaces,
    (e) a first end plate abutting said second stator member and secured in place by screws passing through holes provided in the end plate and threaded into the holes of the proximate offset ends of the said first set of pole pieces,
    (f) a second end plate abutting the third stator member and secured in place by screws passing through holes provided in the second end plate and threaded into the holes of the proximate offset ends of the said second set of pole pieces, and
    (g) a rotor carried by the two end plates.

16. The invention as recited in claim 15, including cooperating markings carried on the outer surfaces of the three stator members indicative of the angular orientation of the sets of pole pieces.

References Cited
UNITED STATES PATENTS

| | | | |
|---|---|---|---|
| 263,134 | 8/1882 | Edison | 310—191 |
| 324,666 | 8/1885 | Diehl | 310—191 |
| 787,292 | 4/1905 | Hatch | 310—191 |
| 813,410 | 2/1906 | Eck | 310—191 |
| 830,262 | 4/1906 | Torda | 310—191 |

OTHER REFERENCES

Croft T.: Practical Electricity, McGraw Hill, New York, 1920, TK 145 C8, pp. 407–411, 435–445, 449–459.

MILTON O. HIRSHFIELD, *Primary Examiner.*

L. L. SMITH, *Assistant Examiner.*